Figure 5:
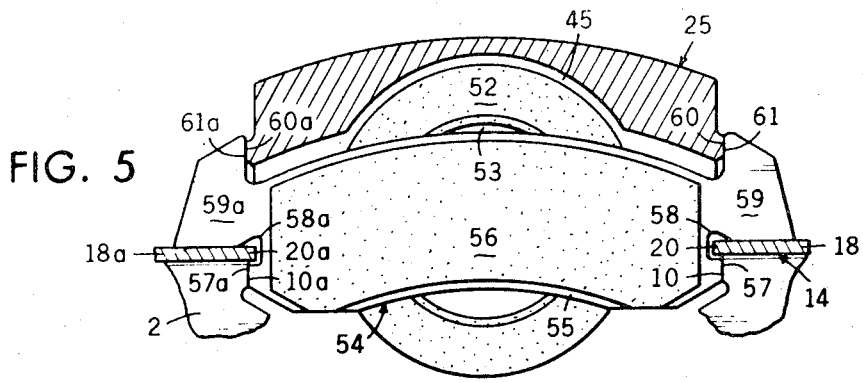

United States Patent [19]
Falk

[11] 3,835,962
[45] Sept. 17, 1974

[54] BRAKE SHOE
[75] Inventor: Edward J. Falk, St. Louis, Mo.
[73] Assignee: Wagner Electric Corporation, Newark, N.J.
[22] Filed: Aug. 15, 1973
[21] Appl. No.: 388,475

Related U.S. Application Data
[60] Continuation of Ser. No. 244,585, April 17, 1972, abandoned, which is a division of Ser. No. 82,332, Oct. 20, 1970, Pat. No. 3,768,604.

[52] U.S. Cl. ............................................. 188/73.1
[51] Int. Cl. ........................................... F16d 65/04
[58] Field of Search ............ 188/73.1, 250 B, 73.4, 188/72.4, 72.5, 72.6, 72.7, 72.8, 72.9, 73.3, 73.5, 73.6

[56] References Cited
UNITED STATES PATENTS
3,392,808  7/1968  Soltis, Jr. ................... 188/72.4 X
3,489,251  1/1970  Swift .............................. 188/72.6
3,525,420  8/1970  Honick et al. ............... 188/73.6 X Primary Examiner—George E. A. Halvosa
Attorney, Agent, or Firm—James R. Bell

[57] ABSTRACT

A spot disc brake having a support defining a fixed closed loop member substantially about a chordal portion of a rotatable disc, and a cylinder portion slidably anchored on the closed loop member adjacent one side of the disc and including a caliper portion extending over the disc chordal portion and slidably anchored on the closed loop member adjacent to the other side of the disc for moving a pair of opposed friction members into frictional engagement with the one and other sides of the disc at the chordal portion thereof. At least one of the friction members is provided with anchoring extensions embracing the caliper for transmitting braking torque thereto, and each anchoring extension having a supporting portion for engagement with the loop member to oppose deflection thereof.

2 Claims, 5 Drawing Figures

PATENTED SEP 17 1974 3,835,962

SHEET 1 OF 2

BRAKE SHOE

This is a continuation of application Ser. No. 244,585, filed Apr. 17, 1972, now abandoned, which was a division of application Ser. No. 82,332, filed Oct. 20, 1970, Pat. No. 3,768,604.

This invention pertains to brake mechanisms and in particular to a spot type disc brake.

In the past, spot type disc brakes for use with a rotatable disc were provided with a support or spider member adjacent to one side of the disc for fixed connection with a vehicle structural member, and a cylinder portion was slidably anchored on said support, said cylinder portion also having a caliper portion integrally formed therewith extending over the disc periphery and juxtaposed with the other side of the disc. A piston was movable in the cylinder portion in one direction in response to fluid pressure applied thereto or urge a friction member into frictional engagement with the one side of said disc, and the torque of this frictional engagement was usually transmitted from the friction member directly to an anchor on the support. The cylinder portion was also movable on the support in the opposite direction in response to the applied fluid pressure acting thereon to concertedly move the caliper portion and another friction member carried thereon toward frictional engagement with the other side of the disc, and the torque of the frictional engagement of said other friction member and disc was transmitted through the caliper portion and the cylinder portion to the anchor on the support. Of course, twisting moments were also created upon acting on the caliper portion upon the frictional engagement of the one and other friction members with the disc which were also transmitted through said caliper portion and the cylinder portion to the anchor on the support. One of the disadvantageous or undesirable features of such past disc brakes was that the physical dimensions or proportions of the support were manifestly rather large since the force of the frictional engagement of both friction members was transferred to only one anchor on said support, and the twisting moment exerted on the caliper portion was also opposed by the same one anchor on said support. In other words, the load imparted by the torque of the frictional engagement and by the twisting moments on the one anchor necessitated a rather large and heavy structural design of the support, and further, the rather large structural size of said support effected mounting difficulties for the brake due to the scarcity of available "under-the-hood" space in the modern vehicle. The rather large structural size of the support not only appreciably added to the upsprung mass of the vehicle, which is also a critical factor in the modern vehicle, but also created assembly problems during the production of the vehicle. Another disadvantageous or undesirable feature of such past disc brakes was that the twisting moment created during braking effected tapered wear of the friction material on the friction members which appreciably reduced the wear life of the friction material necessitating more frequent replacement thereof. Still another disadvantageous or undesirable feature of friction members or brake shoes utilized in such past friction devices was that the shoe opposed anchoring extensions which embraced the caliper for transmitting torque thereto in the direction of disc rotation were unsupported and tended to deflect in response to the braking torque acting thereon.

The principal object of the present invention is to provide a sliding caliper type spot disc brake which overcomes the disadvantageous or undesirable features of the past spot disc brakes, as discussed hereinabove, and this, as well as other objects and advantageous features of the present invention, will become apparent from the specification which follows.

Briefly, the present invention comprises a friction device for use with a rotatable disc and having a pair of stationary support means generally defining a closed loop about substantially a chordal sector of said disc, a pair of friction members adjacent to the opposed sides of said disc, caliper means including opposed portions for urging said friction members into frictional engagement with said opposed disc sides, said support means respectively embracing said opposed portions means and friction members, and one of said opposed portions including actuating means defining therewith cylinder means for subjection to fluid pressure applied thereto, said caliper means and actuating means being movable in opposite directions in response to fluid pressure applied thereto to frictionally engage said friction members with said opposed disc sides. The invention also comprises the use of at least one of the friction members in said friction device having opposed anchoring extensions embracing said caliper means for respectively transmitting the braking torque thereto in the direction of disc rotation, and each of said anchoring extensions including a portion in supporting engagement with said support means to oppose deflection of said anchoring extensions in response to the braking torque acting thereon.

Figure 1:
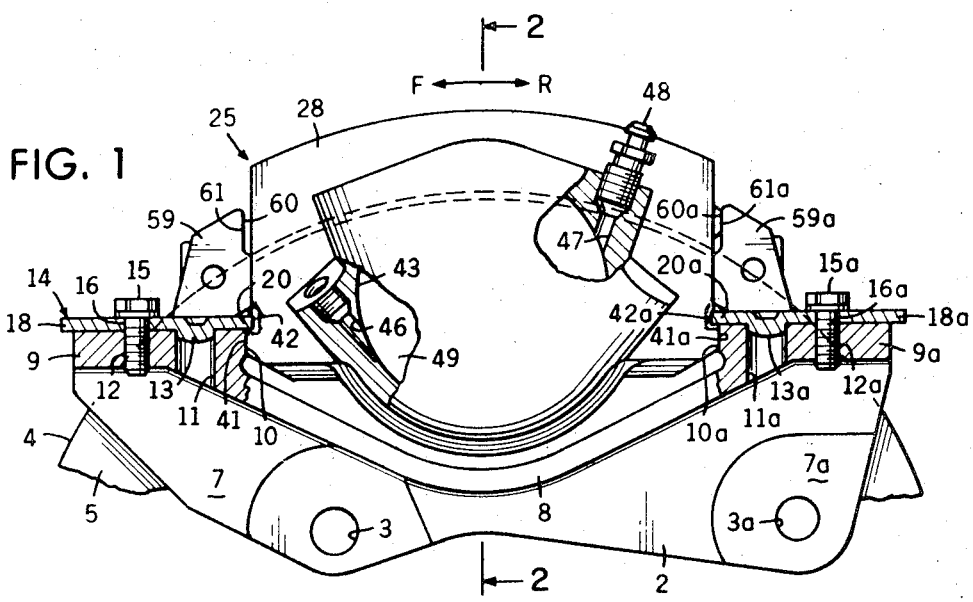
Figure 2:
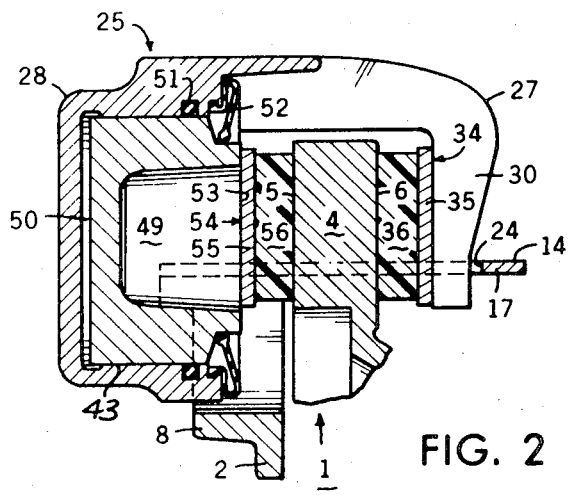
Figure 3:
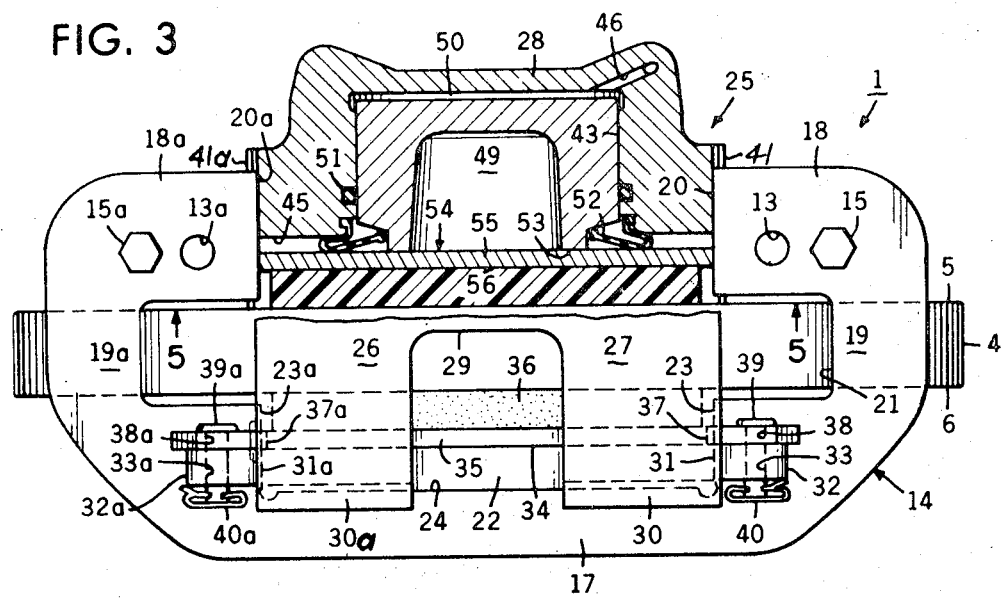
Figure 4:
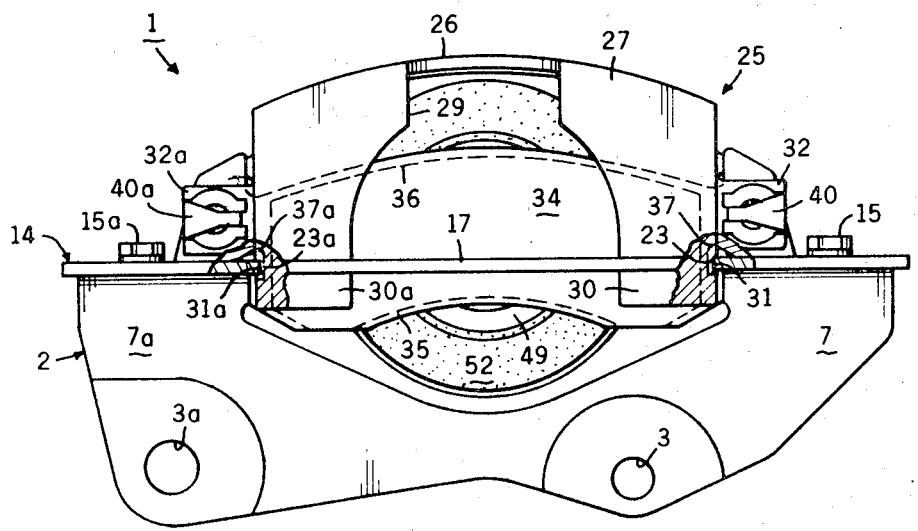

In the drawings wherein like numerals refer to like parts wherever they occur:

FIG. 1 is an elevational view partially in cross-section showing the "inboard" side of the friction device embodying the present invention, FIG. 2 is a sectional view taken along line 2—2 of FIG. 1, FIG. 3 is a plan view partially in cross-section of the friction device embodying the present invention, FIG. 4 is an elevational view partially in cross-section showing the "outboard" side of the friction device embodying the present invention, and FIG. 5 is a partial sectional view taken along line 5—5 of FIG. 3.

Referring now to the drawings in detail and in particular to FIGS. 1 and 2, a friction device or disc brake 1 is provided with a support member or spider 2 having spaced mounting apertures 3, 3a therein for connection by suitable means to a vehicle structural member, such as a steering knuckle or axle flange (not shown), and said support member is positioned adjacent to a rotatable disc or rotor 4 having opposed friction surfaces or inboard and outboard sides 5, 6, said disc being connected by suitable means for forward and reverse rotation, as indicated by the directional arrows in FIG. 1, with a vehicle wheel hub (not shown).

The support member 2 is provided with integrally formed and oppositely extending arm portions 7, 7a substantially parallel with and adjacent to the disc inboard side 5, and a re-enforcing rib 8 having a generally arcuate shape is integrally formed with said arm portions and substantially normal thereto. Opposed spaced anchor flanges 9, 9a are also provided on the support member 2 being integrally formed with the arm portions 7, 7a and rib 8 adjacent to the opposed ends thereof, and said anchor flanges extend in a plane substantially normal to said arm portions and to the disc inboard side 5. The anchor flanges 9, 9a are provided with opposed inner ends or anchoring surfaces 10, 10a which extend in substantially vertical planes normal to the disc inboard side 5, and detent receiving apertures 11, 11a and threaded apertures 12, 12a are vertically provided through said anchor flanges 9, 9a to respectively receive spaced positioning detents 13, 13a provided on another support member or plate 14 and studs 15, 15a for fixedly connecting said support plate with said anchor flanges, said support plate also having stud receiving apertures 16, 16a therein aligned with the threaded apertures 12, 12a.

Referring now to FIGS. 1–3, the support plate 14 extends generally chordwise of the disc 4 and said support plate and the support member 2, in effect, define a stationary closed loop about a substantially chordal sector of said disc. The support plate 14 is provided with a reaction or frame portion 17 at the disc outboard side 6 and opposed connecting tabs or portions 18, 18a at the disc inboard side 5, said connecting portions and frame portion being integrally connected together by opposed end portions 19, 19a which respectively extend across the outer periphery of the disc 4. It should be noted that the peripheral edges of the support plate 14 can, if desired be flanged for added strength purposes. The positioning detents 13, 13a and stud receiving apertures 16, 16a, as previously mentioned, are respectively provided in the connecting portions 18, 18a of the support plate 14 wherein said detents and studs 15, 15a fixedly interconnect said connecting portions with the anchor flanges 9, 9a of the support member 2. The connecting portions 18, 18a are provided with opposed free ends or retaining lips 20, 20a which respectively overlap the anchor surfaces 10 10a of the support member 2, and said free ends intersect with the inboard side of an opening 21 in the support plate 14 through which a peripheral or chordal sector of the disc 4 rotates. The frame portion 17 of the support plate 14 is provided with a recess 22 having opposed side walls or anchor surfaces 23, 23a in substantially facing parallel relation which intersect with the outboard side of the opening 21, and said recess is also provided with a base wall 24 interconnected between the anchor surfaces 23, 23a.

Referring now to FIGS. 2–4, a sliding acliper member, indicated generally at 25, is provided with an intermediate portion 26 extending over the periphery of the disc 4 at the chordal sector thereof and integrally interconnected between depending reaction and cylinder portions 27, 28 which extend generally parallel to the disc outboard side 6 and inboard side 5. The caliper intermediate and reaction portions 26, 27 are bifurcated at 29 to define opposed reaction legs or segments 30, 30a, and said reaction legs are respectively provided with opposed anchoring grooves 31, 31a which are slidably received on the frame portion 17 of the support plate 14 embraced by or in sliding anchoring engagement with the anchors 23, 23a. The reaction legs 30, 30a are respectively provided with integral extension or friction member carrying hubs 32, 32a having pin receiving apertures 33, 33a therethrough. An outboard friction member 34 is provided with a backing plate or pad member 35 in abutting or driven engagement with the reaction legs 30, 30a, and a friction material or brake lining 36 for frictional engagement with the disc outboard side 6 is fixedly connected with said pad by suitable means, such as the well-known bonding method. Opposed guide or retaining grooves 37, 37a are provided in the opposite sides or ends of the pad 35, and the anchors 23, 23a on the frame portion 17 of the support plate 14 are respectively received in said mounting grooves. The pad 35 is also provided with mounting apertures 38, 38a axially aligned with the apertures 33, 33a of the reaction leg hubs 32, 32a, and connecting or thrust pins 39, 39a are fixedly received in said apertures 32, 32a and 38, 38a against displacement by removable spring clips 40, 40a. In this manner, the pad 35 is fixedly received on or connected to the reaction legs 30, 30a by the thrust pins 39, 39a and as discussed fully hereinafter, braking torque or thrust is transmitted from the pad 35 through said thrust pins to said reaction legs and therefrom to the anchors 23, 23a. It should be noted that the pad grooves 37, 37a are spaced from the anchors 23, 23a to obviate braking torque transmission therebetween; however, if desired, said pad grooves could be engaged with said anchors to effect such braking torque transmission therebetween.

Referring now to FIGS. 1–3, the caliper cylinder portion 28 is also provided with opposed anchor surfaces 41, 41a on the opposed ends thereof embraced by or in sliding anchoring engagement with the anchors 10, 10a of the support member anchor flanges 9, 9a, respectively, and guide grooves 42, 42a are also provided in the opposed ends of said caliper cylinder portion in guiding and displacement preventing engagement with the guides 20, 20a on the support plate connecting portions 18, 18a. As discussed fully hereinafter, braking torque is not transmitted between the grooves 42, 42a of the caliper cylinder portion 28 and the guides 20, 20a of the support plate connecting portions 18, 18a; however, said grooves 42, 42a and guides 20, 20a could be engaged, if desired, to effect braking torque transmission therebetween. A blind bore 43 is centrally provided in the caliper cylinder portion 28 intersecting with an interior wall or abutment 45 thereof which extends generally parallel with the disc inboard side 5, and the bore 43 is intersected by inlet and bleeder ports 46, 47, said inlet port being adapted for selective connection with a fluid pressure source (not shown) and said bleeder port being closed by a bleeder plug 48 of a type well-known in the art. A cup-shaped piston or actuating member 49 is slidably received in the blind bore 43 defining therewith an expansible fluid pressure chamber 50 connected in pressure fluid communication with the inlet port 46 and, when desired, bleeding communication with the bleeder port 47. A sealing member or O-ring 51 which is retained in the bore 43 is sealably engaged with the peripheral portion of the piston 49, and another sealing member or boot 52 has its radially outer end retained in said bore while its other or radially inner end thereof extends into sealing engagement with said piston adjacent to the exterior driving or force transmitting end 53 thereof.

Referring to FIGS. 1, 3 and 5, an inboard friction member 54 is provided with a shoe or pad member 55 in driven engagement with the driving end 53 of the piston 49, and a friction material or brake lining 56 for frictional engagement with the disc inboard side 5 is fixedly connected with said pad by suitable means, such as the well-known bonding method. The pad 55 is provided with opposed anchoring surfaces 57, 57a which are embraced by or in sliding anchoring engagement with the anchors 10, 10a of the support member anchoring flanges 9, 9a, respectively, and opposed guide grooves 58, 58a are also provided in said pad for respective abutting and displacement prventing engagement with the guides 20, 20a on the support plate connecting portions 18, 18a. To complete the description of the friction device 1, oppositely extending anchoring ears or flanges 59, 59a are integrally provided on the opposed ends of the pad 55, and opposed anchoring surfaces 60, 60a are provided on said flanges in sliding and anchoring engagement with cooperating opposed anchors 61, 61a integrally provided on the opposed ends of the caliper 25. The pad extensions 59, 59a are also provided with supporting or guiding surfaces 62, 62a which are slidable on the connecting portions 18, 18a of the loop member or plate 14 in supporting or abutting engagement therewith to oppose deflection of said pad extensions in response to the braking torque acting thereon, as described hereinafter. While the extensions 59, 59a are coplanar with the pad member 55 of the friction member 54, such extensions could be offset from the plane of said pad member, as well-known in the art.

In the operation with the disc 4 rotating in the forward direction, fluid pressure is selectively applied to the chamber 50 of the caliper cylinder portion 28 through the inlet port 46, and the applied fluid pressure acts on the effective area of the piston 49 in said chamber to establish a force for moving said piston in a friction device energizing direction toward the disc inboard side 5. Since the exterior end 56 of the piston 49 is drivingly engaged with the pad 55, the established force concertedly moves said piston and pad to urge the lining 56 into frictional engagement with the disc inboard side 5 to retard the rotation of the dic 4. The friction device applying movement of the pad 55 is guided by the cooperative sliding engagement of the pad anchor surfaces 41, 41a and 60, 60a on the support member anchors 10, 10a and the caliper anchors 61, 61a, respectively. The torque of the frictional engagement between the lining 56 and the disc inboard side 5 is transmitted from said lining through the pad 55 and the pad anchoring surface 57 directly to the support member anchor 10, and said torque is also transmitted from said pad through the pad ear 59a and the pad ear anchoring surface 60a to the caliper anchor 61a and therefrom through the caliper 25 and its anchoring surface 41 to said support member anchor 10. It should be noted that the distance between the engagement of the extension support surface 62a with the loop member 14 and the engagement of the extension anchor surface 60a with the caliper anchor 61a substantially defines a moment which acts to deflect the extension 59a in a tangential direction in response to the braking torque acting thereon; however, since the extension supporting surface 62a is engaged with the loop member 14, anu such deflection of said extension further urges said supporting surface into supporting engagement with said loop member to oppose such deflection. In this manner, the supporting engagement between the extension surface 62a and the loop member 14 establishes a reaction force which supports the pad member extension 59a and opposes deflection thereof. With respect to the braking torque transmitted from the pad extension 59a to the caliper anchor 61a, the horizontal component thereof is taken by said caliper anchor directly from the pad extension anchor surface 60a, and also between the groove 58 and loop member 14 upon deflection of the extension 59, the vertical component is transmitted from the pad extension 59a through the portion thereof defining the groove 58a directly to the loop member 14 engaged therewith, and the twisting component is taken by the caliper 25 directly from the shoe 54 and transmitted from said caliper to the support anchors 10, 10a. Of course, the engagement between the grooves 42, 42a of the caliper cylinder portion 28 with the ends 20, 20a on the connecting portions 18, 18a of the support plate prevents vertical displacement of the caliper 25 in response to the braking torque established upon the frictional engagement of the lining 56 with the disc inboard side 5.

At the same time, the applied fluid pressure in the chamber 50 also acts on the effective area of the caliper cylinder portion 28 in said chamber to establish a reaction force for moving the caliper in a friction device energizing direction opposite to that of the piston 49, as discussed hereinabove. The movement of the caliper 25 in the opposite direction is guided by the cooperative sliding engagement of anchor surfaces 41, 41a of the caliper cylinder portion 28 and the anchor surfaces 31, 31a on the caliper reaction legs 30, 30a with the support member anchors 10, 10a and the support plate anchors 23, 23a, respectively. The reaction force effecting the caliper movement in the opposite direction is transferred through the caliper cylinder and intermediate parts 28, 26 to the reaction legs 30, 30a to effect the concerted movement in the opposite direction of the pad 35 urging the lining 36 into frictional engagement with the disc outboard side 6 to retard the rotation of the disc 4 at substantially the same time the lining 56 is engaged with the inboard disc side 5, as previously discussed. The torque of the frictional engagement between the lining 36 and the disc outboard side 6 is transferred from said lining through the pad 35 to the thrust pins 39, 39a and therefrom through the hubs 32, 32a to the caliper reaction legs 30, 30a. Due to the anchoring engagement between the anchor surface 31 of the reaction leg 30 with the support plate anchor 23, the torque is transferred from said reaction leg 30 to the support plate 14 tending to urge said support plate in the forward direction; however, said support plate distributes the torque through its frame portion 17 and end portions 19, 19a to its connecting portions 18, 18 a and therefrom to both of the connecting studs 15, 15a and both of the anchor flanges 9, 9a of the support member 2. Of course, the engagement between the grooves 31, 31a in the caliper reaction legs 30, 30a with the frame member 17 of the support plate 14 adjacent to the anchors 23, 23a prevents vertical displacement of the caliper 25 in response to the braking torque established upon the frictional engagement of the lining 36 with the disc outboard side 6.

It should be noted that the torque established between the lining 36 and disc outboard side 6 upon the frictional engagement thereof establishes a force component substantially in the plane of said frictional engagement acting in the forward direction and having a moment about the connecting stud 15 which tends to twist the caliper 25; however, this twisting moment is opposed by the regidity of the support plate 14, and the twisting force is also distributed through said support plate to both of the connecting studs 15, 15a and therefrom to both of the anchor flanges 9, 9a of the support member 2, as previously discussed with regard to braking torque. In this manner, it is obvious that the aforementioned twisting moment acting on the caliper 25 is substantially obviated by the rigid interconnection of the support plate 14 and support member 2 which, of course, substantially obviates undesired tapered wear on the pad lining 36. In other words, the anchoring engagement between the reaction legs, 30, 30a of the caliper 25 with the anchors 23, 23a of the rigid support plate 14 and the anchoring engagement between the caliper cylinder portion 28 and the anchors 10, 10a of the rigid support member 2 substantially obviates twisting or rotation of said caliper in response to moments produced by the transfer of braking torque from the pad 35 to said caliper thereby substantially obviating angular or tapered wear of the lining 36 and effecting relatively even wear over the wear life thereof.

When the disc 4 is rotated in the reverse direction, the torque from the pad 55 is transmitted directly to the support member anchor 10a, and said torque is also transmitted from the pad ear 59 and anchoring surface 60 to the caliper anchor 61 and therefrom through the caliper 25 and its anchoring surface 41a to said support member anchor 10a. The torque from the pad 36 is transferred through the pins 39, 39a and hubs 32, 32a to the caliper reaction legs 30, 30a. Due to the anchoring engagement between the anchor surface 31a of the reaction leg 30a with the support plate anchor 23a, the torque is transferred from said reaction leg 30 to the support plate 14 tending to urge said support plate in the reverse direction; however, said support plate distributes the torque through its frame portion 17 and end portions 19, 19a to its connecting portions 18, 18a and therefrom to both of the connecting studs 15, 15a and both of the anchor flanges 9, 9a of the support member 2. The twisting movement of the force component of the torque established during such a reverse stop acts in the reverse direction and has a moment arm about the connecting stud 15a, and such twisting movement during such reverse stop is distributed and opposed in the same manner as that previously discussed hereinbefore during the forward stop.

The embodiments of the invention in which an exclusive property or privilege is claimed are defined as follows:

1. A brake shoe for a caliper disc brake assembly comprising:
   a generally planar backing plate;
   friction means supported on said backing plate;
   a pair of opposed anchoring surfaces, one on each end of the plate and facing away from each other, for sliding engagement with a portion of said assembly;
   a pair of opposed guide grooves, one on each end of the plate, for abutting and displacement preventing engagement with another portion of said assembly; and
   a pair of extension means, one on each end of the plate, integral and generally coplanar therewith, including:
   another pair of opposed anchor surfaces thereon, facing each other, for respectively transmitting braking torque to said assembly; and
   a pair of support surfaces on said extension means, one adjacent each end of the plate and generally coplanar therewith for supporting engagement with a further portion of said assembly to oppose deflection of said other pair of anchor surfaces generally in the plane of said backing plate in response to braking torque acting thereon,
   said pair of opposed anchor surfaces, said pair of opposed guide grooves and said pair of supporting surfaces forming a continuous surface on a portion of each end of the plate so that said anchor surfaces and said supporting surfaces extend toward each other at substantially relatively right angular relationship to intersect with said grooves, and
   said other pair of facing opposed anchor surfaces are spaced from said continuous surface by said extension means.

2. A brake shoe according to claim 1, wherein at least a portion of said supporting surfaces extend radially outwardly of said pair and said other pair of said anchor surfaces.

* * * * *

UNITED STATES PATENT OFFICE
CERTIFICATE OF CORRECTION

Patent No. 3,835,962　　　　Dated September 17, 1974

Inventor(s) Edward J. Falk

It is certified that error appears in the above-identified patent and that said Letters Patent are hereby corrected as shown below:

Column 1, line 18, "or" should be -- to --;
line 52, "upsprung" should read -- unsprung --.
Column 5, line 58, "anu" should read -- any --.
Column 8, line 33, after "substantially" insert -- a --.

Signed and sealed this 3rd day of December 1974.

(SEAL)
Attest:

McCOY M. GIBSON JR.　　　　C. MARSHALL DANN
Attesting Officer　　　　Commissioner of Patents